Patented Oct. 12, 1954

2,691,657

UNITED STATES PATENT OFFICE 2,691,657

1-AZA-8-METHYL-9-THIA-ANTHRONES AND THEIR METHOD OF MANUFACTURE

Maurice Martin Coombs and William Herbert Gray, London, England, assignors to Burroughs Wellcome & Co. (U. S. A.) Inc., Tuckahoe, N. Y., a corporation of New York No Drawing. Application July 1, 1952, Serial No. 296,753

Claims priority, application Great Britain July 4, 1951

3 Claims. (Cl. 260—294.8)

One of the compounds must used in the treatment of Schistosomiasis is the thia-anthrone I variously known as Miracil D, Nilodin, etc.

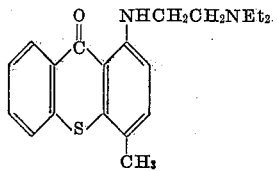

I

While treatment with this compound sometimes effects a cure of the disease, the drug must be administered over a considerable period and at very close to the tolerated dose.

We have discovered that a related substance II, which is 1-aza-5-($\beta$-diethylaminoethylamino)-8-methyl-9-thia-anthrone, possesses definite advantages in the treatment of Schistosomiasis.

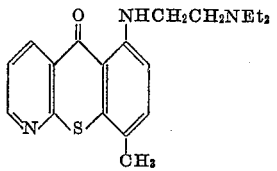

II

In laboratory animals II is at least as toxic to the parasites as I and is only about one-fifth as toxic to the host. Thus there is a far better prospect that a patient may be able to tolerate the drug until cured of his ailment.

The new compound is conveniently synthesized by the following sequence of reactions which are described in detail in the example.

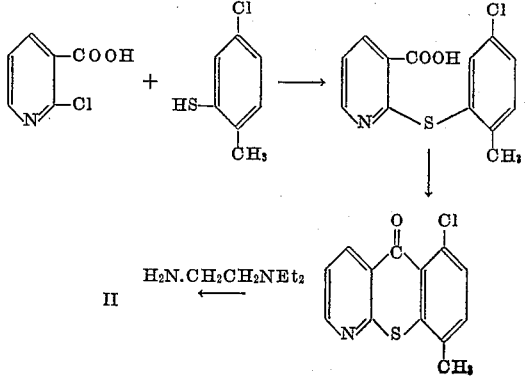

For therapeutic purposes the new compound is usually presented in the form of an acid addition salt which may be a hydrochloride, sulfate, phosphate, lactate, gluconate, acetate, etc. While individual salts may possess certain advantages for specific purposes (i. e., for tabletting the salt should not be hydroscopic; for injecting a solution the salt should be relatively soluble) the therapeutic properties do not reside in the anion of the acid but in the basic moiety. Therefore, we consider all salts with non-toxic acids to be equivalents of each other and of the parent base.

The invention will now be illustrated by the following example, in which temperatures are given in degrees centigrade.

*Example 1*

A mixture of 25 grams of 2-chloronicotinic acid, 25 grams of 5-chloro-2-methylthiophenol, 43.6 grams of anhydrous potassium carbonate, 0.25 grams of copper bronze powder, 0.5 gram of potassium iodide, and 250 cc. of benzyl alcohol, was heated with stirring in an atmosphere of carbon dioxide under reflux condenser at a temperature of 230° for 16 hours. The benzyl alcohol was then removed by steam distillation, the residue clarified, and acidified with dilute hydrochloric acid. The resulting green precipitate was removed by filtration, washed with water and dissolved in 250 cc. of boiling ethyl alcohol with the addition of charcoal. The clear pale orange filtered solution deposited on cooling an almost while microcrystalline powder consisting of 3 - carboxy - 2 - (5'-chloro-2'-methylphenylthiol)-pyridine. After recrystallization from ethyl alcohol and then from benzene it melted at 209–211°.

20.8 grams of this carboxylic acid were dissolved in 155 cc. of concentrated sulphuric acid and heated at 100° for 7 hours. The resulting brilliant scarlet solution was then poured onto ice, producing a pale yellow suspension which was filtered after being allowed to stand overnight. The solid was suspended in dilute sodium hydroxide solution, re-filtered, washed and dried, giving 1-aza-5-chloro-8-methyl-9-thia-anthrone, which after being recrystallized from ethyl alcohol melted at 179–180°.

3 grams of this substance were heated with 10 cc. of $\beta$-diethylaminoethylamine under a reflux condenser at a temperature of 140° for 6 hours. Excess of β-diethylaminoethylamine was then removed by distillation, and the residual oil crystallized on cooling to a mass of red crystals of 1-aza-5-(β-diethylaminoethylamino)-8-methyl-9-thia-anthrone, which after recrystallization from ethyl alcohol melted at 105°.

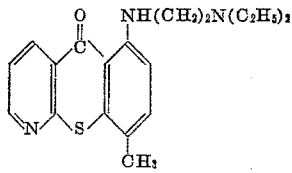

2 grams of this base were dissolved in 50 cc. of ethyl alcohol and treated with one molecular proportion of dilute hydrochloric acid. The solution deposited on standing a mass of needle-like orange crystals of the hydrochloride, which melted at 220°.

We claim:

1. Compounds selected from the class consisting of those having the free base formula

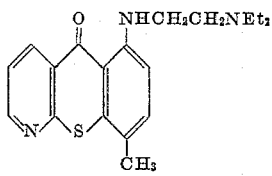

and the non-toxic salts thereof.

2. The method of making a compound of the formula

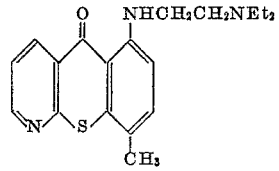

and salts thereof, which comprises reacting 2-chloronicotinic acid with 5-chloro-2-methylthiophenol to produce 3-carboxy-2-(5'-chloro-2'-methylphenylthioal)-pyridine and cyclizing the resulting compound with concentrated sulfuric acid.

3. The method of making a compound of the formula

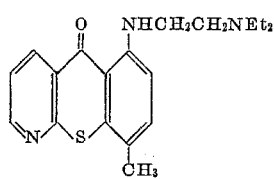

and salts thereof, which comprises reacting 2-chloronicotinic acid with 5-chloro-2-methylthiophenol to produce 3-carboxy-2-(5'-chloro-2'-methylphenylthioal)-pyridine and cyclizing the resulting compound with concentrated sulfuric acid and reacting the resulting compound with β-diethylaminoethylamine.

No references cited.